(12) United States Patent
Ohara

(10) Patent No.: US 11,225,040 B2
(45) Date of Patent: Jan. 18, 2022

(54) TIRE VULCANIZING MOLD, METHOD OF MANUFACTURING PNEUMATIC TIRE, AND PNEUMATIC TIRE

(71) Applicant: TOYO TIRE CORPORATION, Itami (JP)

(72) Inventor: Masaaki Ohara, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 302 days.

(21) Appl. No.: 16/429,139

(22) Filed: Jun. 3, 2019

(65) Prior Publication Data

US 2019/0366662 A1 Dec. 5, 2019

(30) Foreign Application Priority Data

Jun. 4, 2018 (JP) .............................. JP2018-106727

(51) Int. Cl.
*B29D 30/06* (2006.01)
*B60C 13/02* (2006.01)

(52) U.S. Cl.
CPC .......... *B29D 30/0606* (2013.01); *B60C 13/02* (2013.01); *B29D 2030/0617* (2013.01)

(58) Field of Classification Search
CPC ........ B29D 30/0606; B29D 2030/0617; B29C 33/10
See application file for complete search history.

(56) References Cited

U.S. PATENT DOCUMENTS

| 9,868,261 | B2 * | 1/2018 | Takahashi | ............... B29C 33/10 |
| 10,144,188 | B2 * | 12/2018 | Ando | ................. B29D 30/0606 |
| 2017/0173905 | A1 | 6/2017 | Ando | |

FOREIGN PATENT DOCUMENTS

JP 2017-113895 A 6/2017

* cited by examiner

*Primary Examiner* — James P Mackey
(74) *Attorney, Agent, or Firm* — Westerman, Hattori, Daniels & Adrian, LLP

(57) ABSTRACT

A tire vulcanizing mold includes a groove-shaped saw cut and a vent hole which are formed in a forming surface for forming a tire surface, the vent hole being opened in the forming surface so as to communicate with the saw cut, and a vent plug being fitted in the vent hole. The vent plug includes a circular-cylindrical housing interiorly including an air discharging path, a stem being inserted in the housing, and a valve body for opening and closing the air discharging path in an end portion closer to the forming surface. The housing has a top surface positioned closer to the forming surface such that the top surface is positioned closer to the forming surface than a groove bottom of the saw cut. The top surface is provided with a cutout by which the air discharging path and the saw cut are communicated with each other.

7 Claims, 6 Drawing Sheets

TIRE VULCANIZING MOLD, METHOD OF MANUFACTURING PNEUMATIC TIRE, AND PNEUMATIC TIRE

CROSS-REFERENCE TO RELATED APPLICATIONS

This application claims priority of Japanese Patent Application No.: 2018-106727 filed on Jun. 4, 2018, the content of which is incorporated herein by reference.

BACKGROUND OF THE INVENTION

Technical Field

The present invention relates to tire vulcanizing molds, methods for manufacturing a pneumatic tire, and pneumatic tires.

Related Art

As tire vulcanizing molds, there have been known tire vulcanizing molds including groove-shaped saw cuts formed on forming surfaces for forming tire surfaces, vent holes opened in the forming surfaces so as to communicate with these saw cuts, and vent plugs fitted in the vent holes. During vulcanization forming, air interposed between the forming surfaces and tire surfaces is discharged through the vent plugs via the saw cuts, which suppresses the occurrence of bares in the pneumatic tires formed through the vulcanization (lacks in the surfaces of the pneumatic tires, which are caused by air interposed between the forming surfaces and the tires).

As such vent plugs, there have been known spring vents including a circular-cylindrical housing which interiorly has an air discharging path, a stem which is inserted in the housing and is provided, at its end portion closer to a forming surface, with a valve body for opening and closing the air discharging path, and biasing means for biasing the stem toward the forming surface (refer to No. JP-A-2017-113895, for example).

In JP-A-2017-113895, a spring vent is fitted in a vent hole such that its top surface closer to a forming surface is positioned farther from a cavity than the forming surface. Namely, the amount of protrusion of the housing into a saw cut is reduced. As a result thereof, during vulcanization forming, the housing is inhibited from obstructing air flowing from the saw cut to the air discharging path, which can suppress the occurrence of bares.

SUMMARY

According to JP-A-2017-113895, the top surface of the spring vent is positioned farther from the cavity than the forming surface, which causes a rubber to flow into the space between the forming surface and the top surface of the spring vent in the vent hole. Consequently, the pneumatic tire formed through the vulcanization is made to include a circular-cylindrical spring-vent mark resulted from the vulcanization applied to the rubber flowed into the aforementioned space, which degrades the aesthetic appearance of the tire.

Particularly, since the vent hole is formed so as to communicate with the saw cut, the circular-cylindrical spring-vent mark with a larger width than that of saw-cut marks is coupled to the saw-cut marks having a substantially constant width, which tends to make the spring-vent mark more conspicuous.

It is an object of the present invention to provide a tire vulcanizing mold, a method for manufacturing a pneumatic tire, and a pneumatic tire which enable ensuring air discharging performance during vulcanization forming using the tire vulcanizing mold including saw cuts and a spring vent having an air discharging path which communicates with the saw cuts and, also, enable manufacturing a pneumatic tire using this mold so as to make a spring-vent mark therein less conspicuous, for suppressing degradation of the aesthetic appearance of the pneumatic tire.

The present invention provides a tire vulcanizing mold including a groove-shaped saw cut and a vent hole which are formed in a forming surface for forming a tire surface, the vent hole being opened in the forming surface so as to communicate with the saw cut, and a vent plug being fitted in the vent hole, wherein the vent plug includes a circular-cylindrical housing interiorly including an air discharging path, and a stem being inserted in the housing and including a valve body for opening and closing the air discharging path in its end portion closer to the forming surface, and the housing has a top surface positioned closer to the forming surface such that the top surface is positioned closer to the forming surface than a groove bottom of the saw cut, and the top surface is provided with a cutout by which the air discharging path and the saw cut are communicated with each other.

According to the present invention, during application of vulcanization forming (molding) to a green tire, even though the housing is protruded into the saw cut, air is efficiently discharged to the air discharging path from the saw cut through the cutout. On the other hand, the pneumatic tire manufactured using this tire vulcanizing mold is caused to include a spring-vent mark having a smaller height from the tire surface than that of saw-cut marks. Namely, it is possible to suppress the occurrence of bares by ensuring the air discharging property during vulcanization forming and, also, it is possible to suppress the degradation of the aesthetic appearance by making the spring-vent mark less conspicuous, in the pneumatic tire formed through vulcanization.

Preferably, the cutout is formed within a range of the saw cut in a depth direction.

With this configuration, it is possible to inhibit the cutout mark from being excessively enlarged, thereby suppressing the degradation of the aesthetic appearance due to the cutout mark, while ensuring the performance of air discharge from the saw cut to the air discharging path through the cutout.

Further, preferably, the cutout is formed so as to be continuous with a groove bottom surface and a groove wall surface of the saw cut.

With this configuration, it is possible to form the cutout continuous with the saw cut in the housing, at the same time as forming the saw cut in the forming surface in the tire vulcanizing mold through mechanical machining for example, in a state where the housing in the spring vent has been preliminarily fitted in the vent hole. This enables easily making the saw cut and the cutout communicate with each other, in comparison with cases where the cutout is preliminarily formed in only the housing and, also, the saw cut is preliminarily formed in the forming surface and, then, the housing is fitted into the vent hole while being adjusted in orientation such that the cutout communicates with the saw cut.

Further, preferably, the housing is provided with a tapered surface having a diameter increased toward the forming surface in its opening portion at which the air discharging path is opened to the forming surface, the valve body is formed to have a truncated conical shape widened toward the forming surface, the valve body has a side surface portion having a portion which comes in contact with the tapered surface of the housing to form a sealing portion for closing the air discharging path, and the cutout is positioned closer to the forming surface than an end portion of the sealing portion which is farther from the forming surface.

With this configuration, it is possible to properly form the sealing portion to close the air discharging path, in the state where the valve body comes in contact with the tapered surface, which can suppress squeeze-out of the rubber into the air discharging path, even though there is formed the cutout.

Further, preferably, the vent hole is formed such that an axis center of the vent hole is deviated in one side with respect to a grove center of the saw cut.

With this configuration, it is possible to increase the degree of freedom for the position at which the vent hole is formed.

Further, preferably, the vent hole is formed so as to be inclined in the one side in which the vent hole is deviated, toward a side farther from the forming surface.

With this configuration, it is possible to easily form the spring-vent mark such that its portion deviated in the one side with respect to the saw-cut mark has a smaller height from the tire surface than that of the portion of the spring-vent mark in the other side, thus making the spring-vent mark less conspicuous.

Further, another aspect of the present invention provides a method for manufacturing a pneumatic tire by performing vulcanization forming on a green tire, using the aforementioned tire vulcanizing mold.

With the present invention, it is possible to manufacture a pneumatic tire so as to make a spring-vent mark therein less conspicuous, while ensuring the air discharging performance during vulcanization forming.

Further, yet another aspect of the present invention provides a pneumatic tire including a convex-shaped saw-cut mark which is a mark of a groove-shaped saw cut in a tire vulcanizing mold, and a circular-cylindrical spring-vent mark which is a mark of a spring vent in the tire vulcanizing mold, the saw-cut mark and the spring-vent mark having been formed on a tire surface, wherein the spring-vent mark and the saw-cut mark are coupled to each other, the spring-vent mark has a smaller height from the tire surface than that of the saw-cut mark, and there are further formed an extending portion extending from an end portion of the saw-cut mark onto a top surface of the spring-vent mark, at the coupled portion of the saw-cut mark and the spring-vent mark.

With the present invention, it is possible to provide a pneumatic tire containing reduced bares, by ensuring the air discharging performance during the vulcanization forming, while making a spring-vent mark therein less conspicuous.

With a tire vulcanizing mold, a method for manufacturing a pneumatic tire, and a pneumatic tire according to the present invention, it is possible to ensure air discharging performance during vulcanization forming and, also, to enable forming a pneumatic tire through vulcanization so as to make a spring-vent mark therein less conspicuous, for suppressing degradation of the aesthetic appearance of the pneumatic tire.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Hereinafter, an embodiment of the present invention will be described with reference to the accompanying drawings. Incidentally, the following description is merely illustrative and is not intended to limit the present invention, objects to which the present invention is applicable, and applications of the present invention. Further, the drawings are schematic, and ratios between respective sizes and the like are different from actual values.

Figure 1:
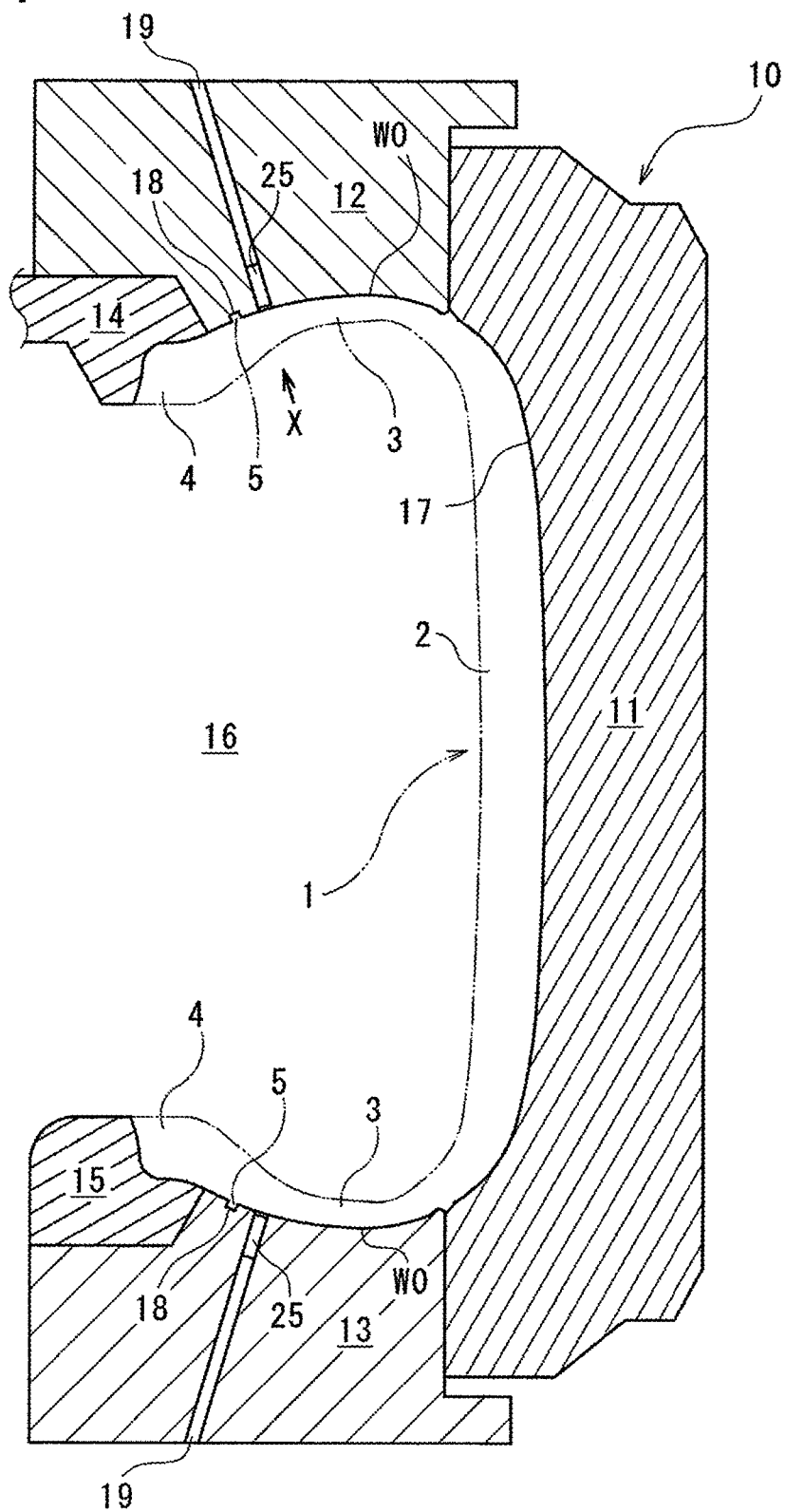
FIG. 1 is a cross-sectional view of a tire vulcanizing mold according to an embodiment of the present invention.

FIG. 1 is a cross-sectional view schematically illustrating the structure of a tire vulcanizing mold 10 according to an embodiment of the present invention, illustrating only one side (the right side in FIG. 1) of the same in a tire radial direction. Further, in FIG. 1, there is illustrated a pneumatic tire 1 to be formed through vulcanization using the tire vulcanizing mold 10, which is represented by an imaginary line (a two-dot chain line). The pneumatic tire 1 is manufactured by performing vulcanization forming on a green tire being set in the tire vulcanizing mold 10 such that the tire axis is oriented in the upward and downward direction.

As illustrated in FIG. 1, the tire vulcanizing mold 10 is formed to be a so-called segmented mold, which includes an annular sector mold 11, a pair of upper and lower side plates 12 and 13 positioned on the inner-diameter side of the sector mold 11, and a pair of upper and lower bead rings 14 and 15 positioned on the inner-diameter sides of the side plates 12 and 13, such that there is defined, inside them, a cavity 16 for forming the pneumatic tire 1 through vulcanization.

The respective inner wall surfaces of the sector mold 11, the side plates 12 and 13 and the bead rings 14 and 15, which define the cavity 16, are formed to be a forming surface 17 for forming a tread portion 2, a side wall portion 3 and a bead portion 4 of the pneumatic tire 1, respectively, through vulcanization.

The forming surface 17 is provided with groove-shaped rim line grooves 18 for forming rim lines 5 through vulcanization, in its inner-diameter side portions in the side plates 12 and 13. The rim lines 5 are for making sure that the rim lines 5 and a normal rim are concentric when the pneumatic tire 1 has been mounted on the normal rim, which enables confirming whether or not the pneumatic tire 1 has been correctly mounted on the normal rim.

Further, the side plates 12 and 13 are provided with vent holes 19 in the outer side in tire radial direction with respect to the rim line grooves 18, wherein the vent holes 19 extend from the forming surface 17 in the direction normal to this surface and penetrate therethrough up to the outside of the tire vulcanizing mold 10. In the vent holes 19 at their end portions closer to the forming surface 17, respective spring vents 25 (vent plugs) are fitted.

Figure 2:
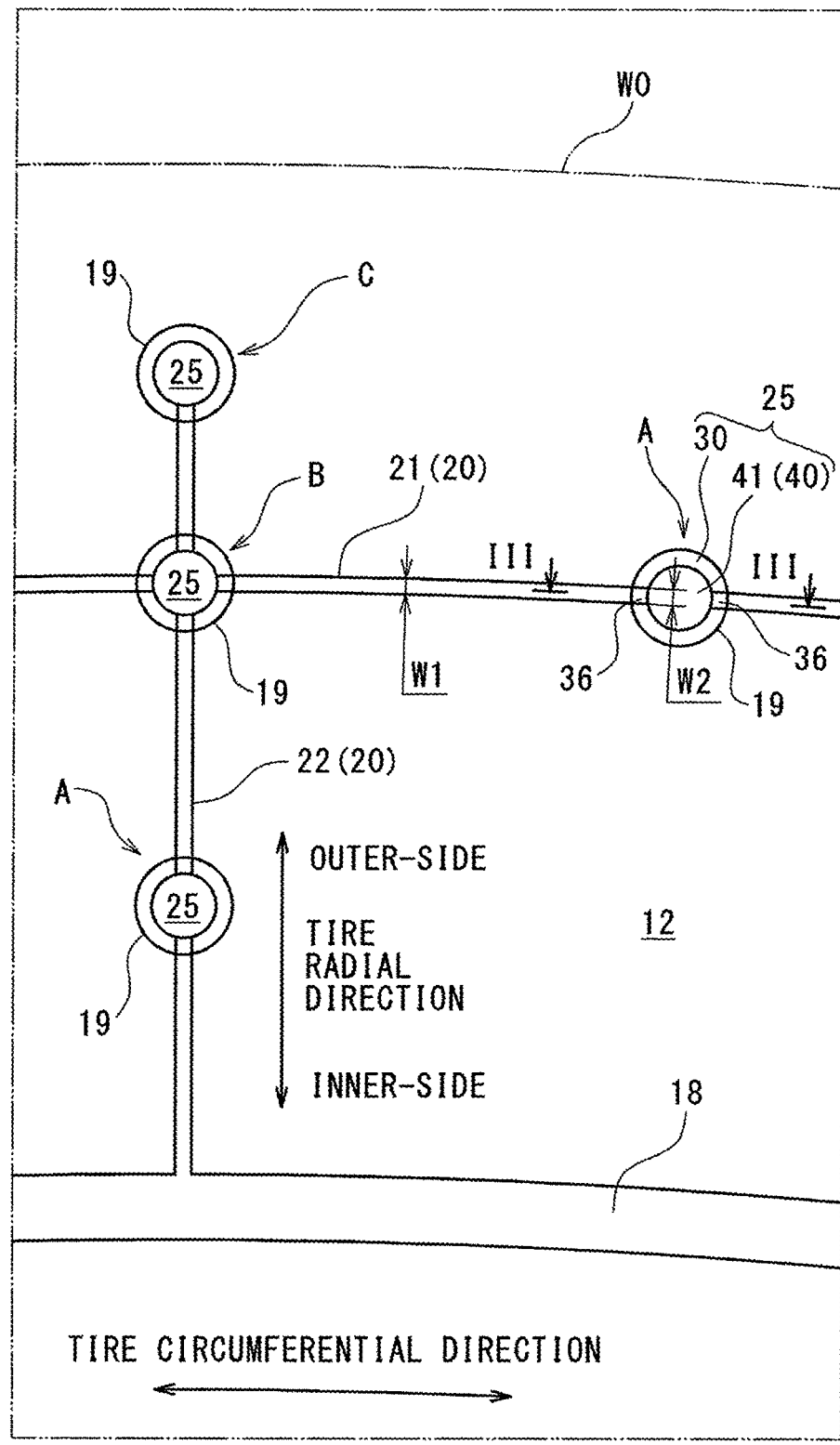
FIG. 2 is a view illustrating a forming surface in the tire vulcanizing mold, taken along an arrow X in FIG. 1.

FIG. 2 is a view illustrating the forming surface of the side plate 12, taken along an arrow X in FIG. 1. As illustrated in FIG. 2, the side plate 12 is provided with groove-shaped saw cuts 20 at two or more positions in the outer side in the tire radial direction with respect to the rim line groove 18. The saw cuts 20 include a circumferential saw cut 21 extending in the tire circumferential direction and a radial saw cut 22 extending in the tire radial direction.

The radial saw cut 22 is formed so as to communicate with the rim line groove 18 and/or the circumferential saw cut 21, and the rim line groove 18 and the circumferential saw cut 21 communicate with each other, through the radial saw cut 22. The saw cuts 20 have a groove width W1 equal to or more than 0.3 mm but equal to or less than 2.0 mm and have a groove depth L0 (see FIG. 3) equal to or more than 0.2 mm but equal to or less than 1.5 mm, for example.

The vent holes 19 are formed so as to communicate with halfway portions of the saw cuts 20 (represented by A in FIG. 2), the portions of the intersections of the circumferential saw cut 21 and the radial saw cut 22 (represented by B in FIG. 2), and end portions of the saw cuts 20 (represented by C in FIG. 2). During vulcanization forming, air interposed between the green tire and the forming surface 17 is discharged to the outside of the tire vulcanizing mold 10, through the vent holes 19, via the rim line groove 18 and the saw cuts 20.

In this case, in the area between a tire largest-width position W0 and the rim line groove 18 in the tire radial direction, there is a tendency to concentrate the end portions of tire constituent members, such as a side wall rubber, a rim strip rubber and a bead filler rubber, and there is a tendency to form step portions between these members. In the present embodiment, many vent holes 19 and many saw cuts 20 are formed in this area, which enables efficiently discharging air, which tends to stagnate at the step portions between the two or more tire constituent members.

Figure 3:
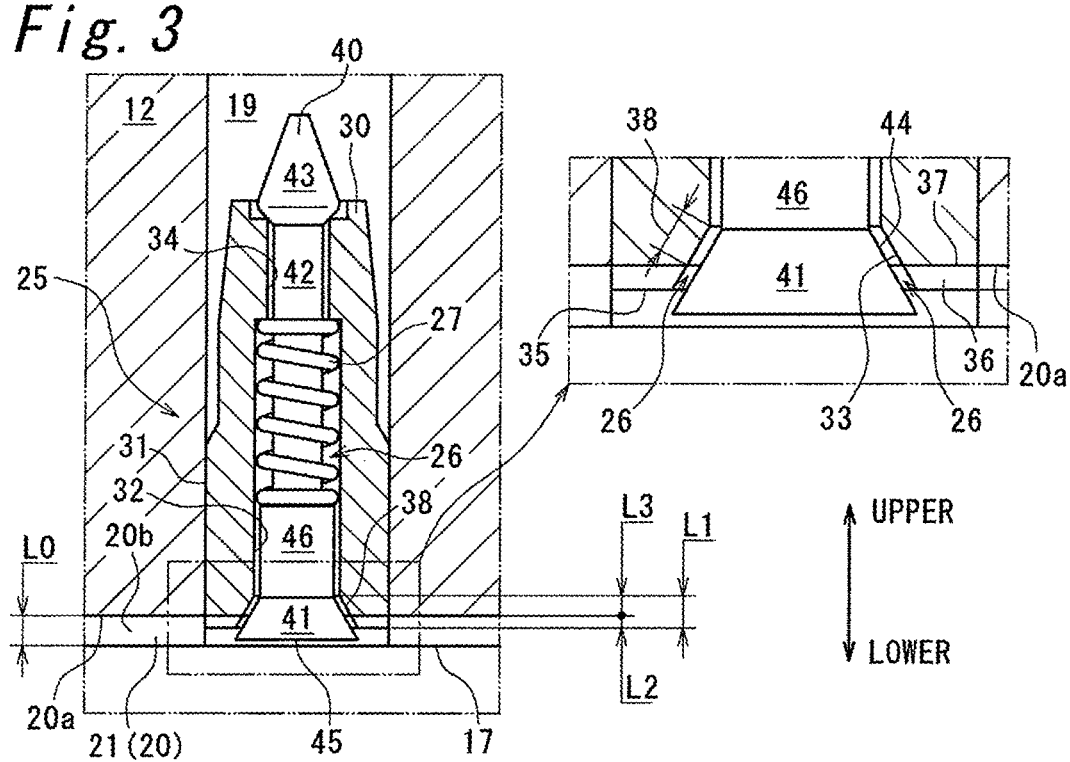
FIG. 3 is a cross-sectional view taken along a line III-III in FIG. 2.

FIG. 3 is a cross-sectional view taken along a line III-III in FIG. 2, illustrating longitudinal cross sections of the vent hole 19 formed halfway through the circumferential saw cut 21, and the spring vent 25 fitted therein. Further, the vent hole 19 is formed such that its center axis is coincident with the groove center of the circumferential saw cut 21. Incidentally, for convenience of description, the direction in which the vent hole 19 extends from the forming surface 17 in the direction normal to this surface will be referred to as an upward and downward direction, the forming-surface-17 side will be referred to as a lower side, and the side opposite thereto will be referred to as an upper side.

As illustrated in FIG. 3, the spring vent 25 includes a circular-cylindrical housing 30 having an air discharging path 26 defined therein, a stem 40 inserted in the housing 30, and a coil spring 27 adapted to bias the stem 40 toward the forming surface 17.

The housing 30 is fitted and held in the vent hole 19 at its outer peripheral portion 31. The housing 30 is provided with an inner peripheral portion 32 penetrating therethrough in the axial direction, and the inner peripheral portion 32 forms the air discharging path 26. The inner peripheral portion 32 is provided, at its opening portion positioned at its lower end, with a tapered surface 33 having a diameter increasing in the downward direction in a conical shape. Further, the inner peripheral portion 32 is provided with a reduced-diameter portion 34 at its upper portion. The tapered surface 33 has a size, in the upward and downward direction, of L1.

The stem 40 includes a valve body 41 positioned at its lower end portion, a shaft portion 42 extending upwardly from the upper end portion of the valve body 41, and a stopper 43 positioned at its upper end portion. The valve body 41 is formed to have a truncated conical shape with a diameter increasing in the downward direction and has a side surface portion 44 extending in parallel with the tapered surface 33 of the housing 30.

The shaft portion 42 is provided, at its lower portion, with a larger-diameter portion 46 having an outer diameter larger than that of its upper portion. Around the shaft portion 42, a coil spring 27 is elastically provided between the larger-diameter portion 46 and the reduced-diameter portion 34 of the inner peripheral portion 32. Further, the stopper 43 is positioned on the reduced-diameter portion 34 and, also, has an outer diameter larger than the inner diameter of the reduced-diameter portion 34. The stem 40 is restricted in downward movement at the stopper 43, by the reduced-diameter portion 34, so that the stem 40 is prevented from being pulled out toward the forming surface 17.

When the stem 40 has been upwardly pushed against the biasing force of the coil spring 27, due to the flow of the rubber in the green tire being subjected to vulcanization forming, the side surface portion 44 of the valve body 41 and the tapered surface 33 of the housing 30 come into surface-to-surface contact with each other, thereby forming, therebetween, a sealing portion which closes the air discharging path 26.

In the state where the valve body 41 comes in contact with the tapered surface 33, a stem top surface 45 at the lower end of the stem 40 is flush with a housing top surface 35 at the lower end of the housing 30, so that a sealing portion is formed between the tapered surface 33 and the valve body 41 over the entire range of the tapered surface 33 in the upward and downward direction. Accordingly, the size of the sealing portion in the upward and downward direction is L1, which is equal to the size of the tapered surface 33 in the upward and downward direction.

In this case, the housing 30 is fitted in the vent hole 19 such that its lower end portion protrudes within the saw cut 20. In other words, the housing top surface 35 is closer to the forming surface 17 than a groove bottom surface 20a of the saw cut 20 and is positioned within the range of the saw cut 20 in a depth direction. Further, referring to FIG. 2 along therewith, the housing top surface 35 is formed with a groove-shaped cutout 36 which communicates with the saw cut 20.

The cutout 36 is formed so as to be upwardly cut into the housing top surface 35 and causes the outer peripheral portion 31 of the housing 30 and the tapered surface 33 of the inner peripheral portion 32 to communicate with each other in the radial direction. The cutout 36 has a groove width W2 which is equal to the groove width W1 of the saw cut and has a cutout depth L2 which is smaller than the length L1 of the tapered surface 33. Namely, in the tapered surface 33, the portion with a length L3 which is resulted from the subtraction of L2 from L1 is formed to be a non-cutout portion 38 which is not cut out by the cutout 36.

Further, in consideration of the sealing characteristics of the sealing portion, the length L3 of the non-cutout portion 38 is preferably equal to or more than 0.5 mm, or the length of the cutout depth L2 is preferably equal to or less than 40% of the length L1 of the sealing portion. Further, in consideration of the performance of air discharge through the cutout 36, the cutout depth L2 is preferably set to be equal to or more than 0.3 mm, and the groove width W2 is preferably set to be equal to or more than 0.5 mm.

Further, in the present embodiment, the cutout 36 has a groove bottom surface 37 which is positioned at the same height in the upward and downward direction as that of the groove bottom surface 20a of the saw cut 20. Namely, the cutout depth L2 is equal to the amount of protrusion of the housing 30 into the saw cut 20 and, more specifically, the cutout depth L2 is set to be larger than zero but equal to or less than the groove depth L0 of the saw cut 20. Since the groove width W2 is equal to the groove width W1 of the saw cut 20, and the groove bottom surface 37 is coincident with the groove bottom surface 20a of the saw cut 20, the cutout 36 is formed such that the groove bottom surface 20a and the groove wall surface 20b of the saw cut 20 are extended continuously with the cutout 36.

Figure 4:
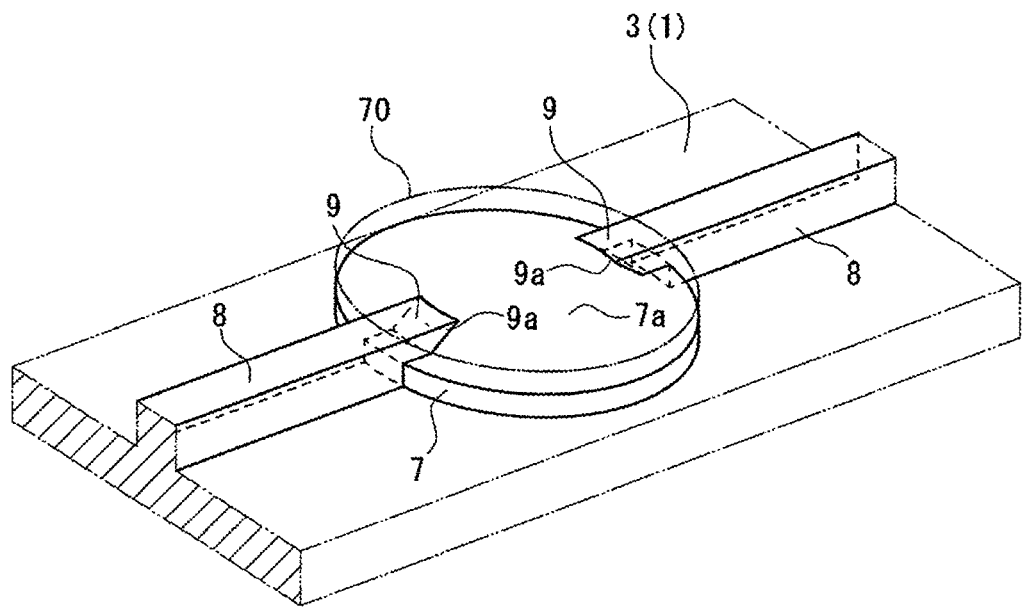
FIG. 4 is a partially-enlarged perspective view of a pneumatic tire, illustrating a spring-vent mark and saw-cut marks.

FIG. 4 is an enlarged perspective view illustrating a portion of the pneumatic tire 1 formed through vulcanization using the tire vulcanizing mold 10 according to the aforementioned embodiment, more specifically, illustrating a portion of the side wall portion 3 in the pneumatic tire 1, wherein this portion of the side wall portion 3 has been formed through vulcanization by a portion of the tire vulcanizing mold 10 which is provided with a saw cut 20 and a spring vent 25.

As illustrated in FIG. 4, the pneumatic tire 1 is provided, on its surface, with a spring-vent mark 7 with a circular cylindrical shape, and a pair of convex-shaped saw-cut marks 8 which are coupled to opposite sides of the spring-vent mark 7. Further, at the respective coupled portions of the spring-vent mark 7 and the pair of saw-cut marks 8, there are a pair of extending portions 9 extending from the end portions of the saw-cut marks 8 onto a top surface 7a of the spring-vent-mark 7, which have been formed through vulcanization.

Further, in FIG. 4, as a comparative example, there is illustrated, by a two-dot chain line, a spring-vent mark 70 in a case where the spring vent 25 is fitted to the vent hole 19 such that the housing top surface 35 is coincident with the groove bottom surface 20a of the saw cut 20.

The spring-vent mark 7 is resulted from vulcanization forming applied to an un-vulcanized rubber flowed into the space under the spring vent 25 in the vent hole 19, and the spring-vent mark 7 is also a mark of the vent hole 19. The saw-cut marks 8 are resulted from the vulcanization forming applied to the un-vulcanized rubber flowed into the saw cut 20, and the saw-cut marks 8 are marks of the saw cut 20. The pair of the extending portions 9 are resulted from the vulcanization forming applied to the un-vulcanized rubber flowed into the cutout 36 in the housing 30, and the pair of the extending portions 9 are marks of the cutout 36.

The extending portions 9 extend so as to intrude into the spring-vent mark 7 while maintaining the cross-sectional shape of the saw-cut marks 8. Their extending end surfaces 9a are inclined upwardly in the direction of the extension, in conformance to the side surface portion 44 of the valve body 41 of the stem 40.

Since the spring vent 25 is provided so as to protrude into the saw cut 20, the spring-vent mark 7 has a smaller height in the upward and downward direction than that of the saw-cut marks 8. Further, in comparison with the spring-vent mark 70 in the comparative example, the spring-vent mark 7 according to the present embodiment has a smaller height and, therefore, is less conspicuous.

With the tire vulcanizing mold 10 described above, as illustrated in FIG. 3, during the application of vulcanization forming to the green tire, even though the housing 30 is protruded into the saw cut 20, air is efficiently discharged to the air discharging path 26 from the saw cut 20 through the cutout 36. On the other hand, as illustrated in FIG. 4, in the pneumatic tire 1 manufactured using the tire vulcanizing mold 10, the spring-vent mark 7 has a smaller height from the tire surface than that of the saw-cut marks 8.

Namely, it is possible to suppress the occurrence of bares by ensuring the air discharging property during vulcanization forming and, also, it is possible to suppress the degradation of the aesthetic appearance by making the spring-vent mark 7 less conspicuous, in the pneumatic tire 1 formed through vulcanization.

Further, in the present embodiment, since the cutout 36 is formed within the range of the saw cut 20 in a depth direction, it is possible to inhibit the extending portions 9 from being excessively enlarged in the pneumatic tire 1, thereby suppressing the degradation of the aesthetic appearance due to the extending portions 9, while ensuring the performance of air discharge from the saw cut 20 to the air discharging path through the cutout 36.

Further, since the cutout 36 is formed so as to be continuous with the groove bottom surface 20a and the groove wall surface 20b of the saw cut 20, it is possible to form the cutout 36 continuous with the saw cut 20 in the housing 30, at the same time as forming the saw cut 20 in the forming surface 17 in the tire vulcanizing mold 10 through mechanical machining for example, in a state where the housing 30 in the spring vent 25 has been preliminarily fitted in the vent hole 19. This enables easily making the saw cut 20 and the cutout 36 communicate with each other, in comparison with cases where the cutout 36 is preliminarily formed in only the housing 30 and, also, the saw cut 20 is preliminarily formed in the forming surface 17 and, then, the housing 30 is fitted into the vent hole 19 while being adjusted in orientation such that the cutout 36 communicates with the saw cut 20.

Further, since the cutout depth L2 is smaller than the size L1 of the sealing portion in the upward and downward direction and, further, is positioned closer to the forming surface 17 than the opposite end portion of the sealing portion from the forming surface 17, the sealing portion can be properly formed to close the air discharging path 26, in the state where the valve body 41 comes in contact with the tapered surface 33. This enables suppressing squeeze-out of the rubber into the air discharging path 26, even though there is formed the cutout 36.

While, in the aforementioned embodiment, the cutout 36 is formed so as to be continuous with the groove bottom surface 20a and the groove wall surface 20b of the saw cut 20, the present invention is not limited thereto. Namely, in a tire vulcanizing mold 50 illustrated in FIG. 5, as represented by A1, a cutout 36 can be also formed to have a smaller width than the groove width W1 of a saw cut 20, and/or as illustrated in FIG. 6, its bottom surface 37 can be set to be positioned below (closer to the forming surface 17 than) the groove bottom surface 20a of the saw cut 20.

Figure 7:
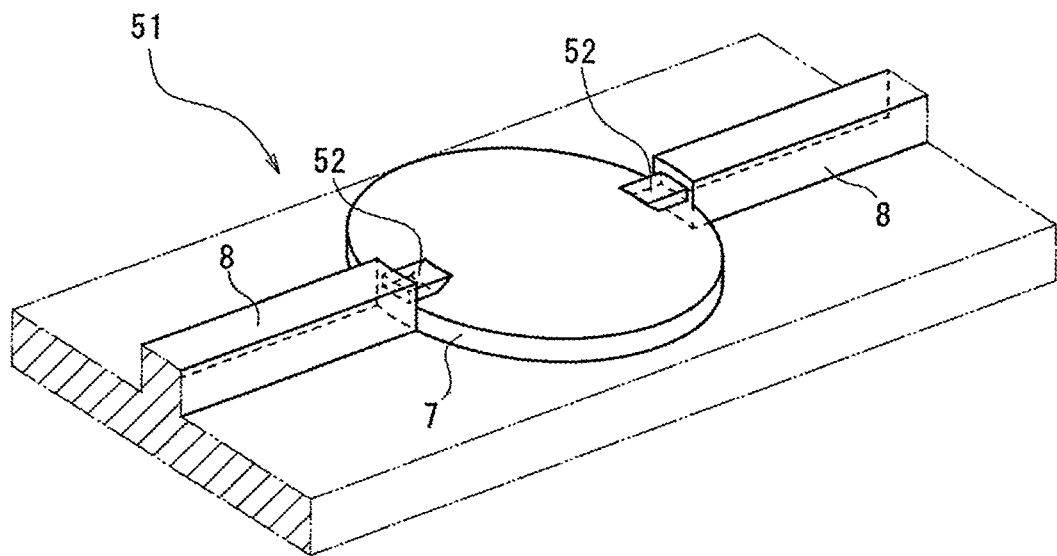
FIG. 7 is a partially-enlarged perspective view of a pneumatic tire, similar to FIG. 4, according to a modified vulcanizing mold.

By doing this, as illustrated in FIG. 7, a pneumatic tire 51 formed through vulcanization using the tire vulcanizing mold 50 is made to include extending portions 52 smaller than the extending portions 9 illustrated in FIG. 4, which makes the extending portions 52 less conspicuous, thereby making it easier to suppress the degradation of the aesthetic appearance due to the extending portions 52 in the pneumatic tire 51.

Figure 5:
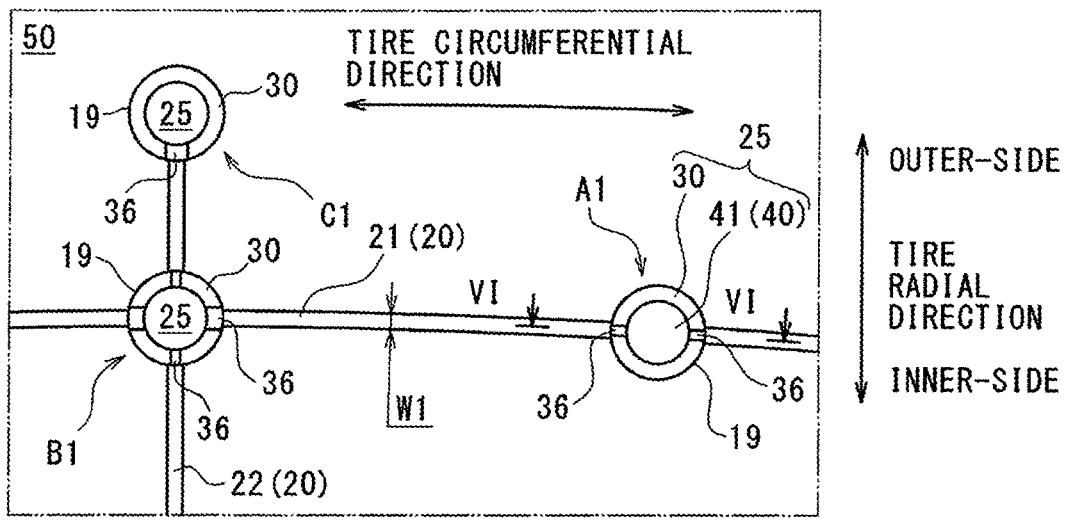
FIG. 5 is a view illustrating a forming surface according to a modified vulcanizing mold.
Figure 6:
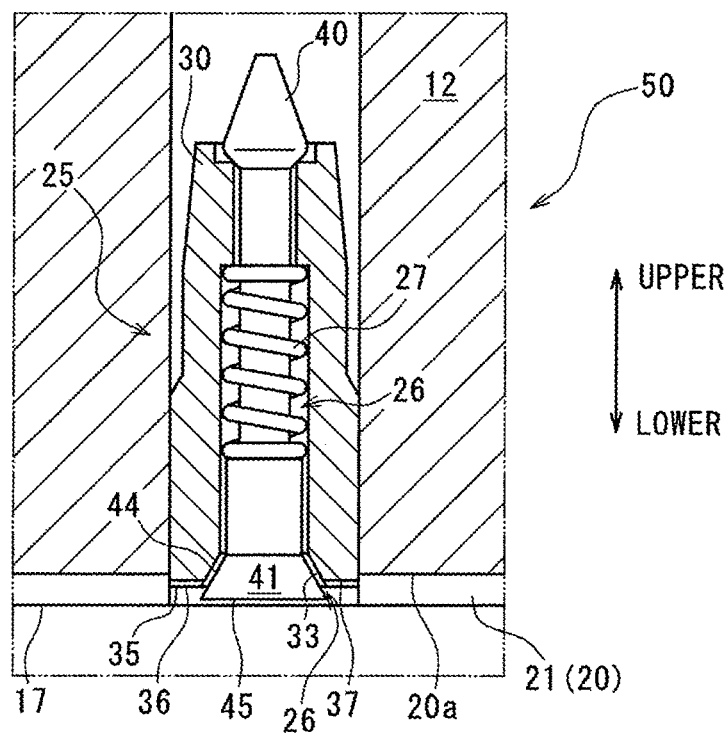
FIG. 6 is a cross-sectional view taken along a line VI-VI in FIG. 5.

Besides, as represented by B1 in FIG. 5, a cutout 36 can be also formed to have a larger width than the groove width W1 of the circumferential saw cut 20 and, also, as represented by C1 in FIG. 5, a cutout 36 can be formed to have a width larger than the groove width W1 of the radial saw cut 20.

Further, while, in the present embodiment, the vent holes 19 are formed such that their center axes are coincident with the groove centers of the saw cuts 20, the present invention is not limited thereto. Namely, as represented by A2, in a tire vulcanizing mold 60 illustrated in FIG. 8, a vent hole 62 can be also formed such that its center axis is deviated in one side with respect to the groove center of the saw cut 20. Further, there is represented, by A2 in FIG. 8, a case where the vent hole 62 is deviated in an outer-diameter side in the tire radial direction with respect to the groove center of the saw cut 20. In this case, similarly, the saw cut 20 is deviated within the range of the tapered surface 33, such that the saw cut 20 communicates with the air discharging path 26 formed in the housing 30.

Figure 9:
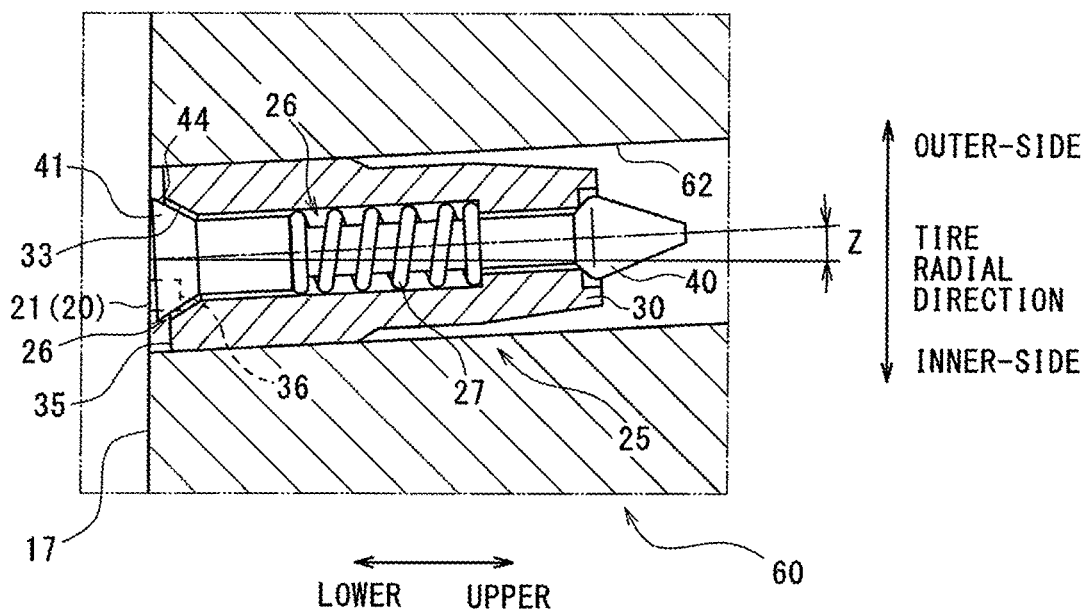
FIG. 9 is a cross-sectional view taken along a line IX-IX in FIG. 8.

Further, in this case, as illustrated in FIG. 9, the vent hole 62 can be formed so as to be inclined in the direction of deviating of the vent hole 62 (namely, outwardly in the tire radial direction), toward the opposite side of the forming surface 17. In FIG. 9, there is illustrated a case where the vent hole 62 is inclined outwardly in the tire radial direction, toward the side opposite to the forming surface 17, at an inclination angle Z, with respect to the direction normal to the forming surface 17.

Figure 10:
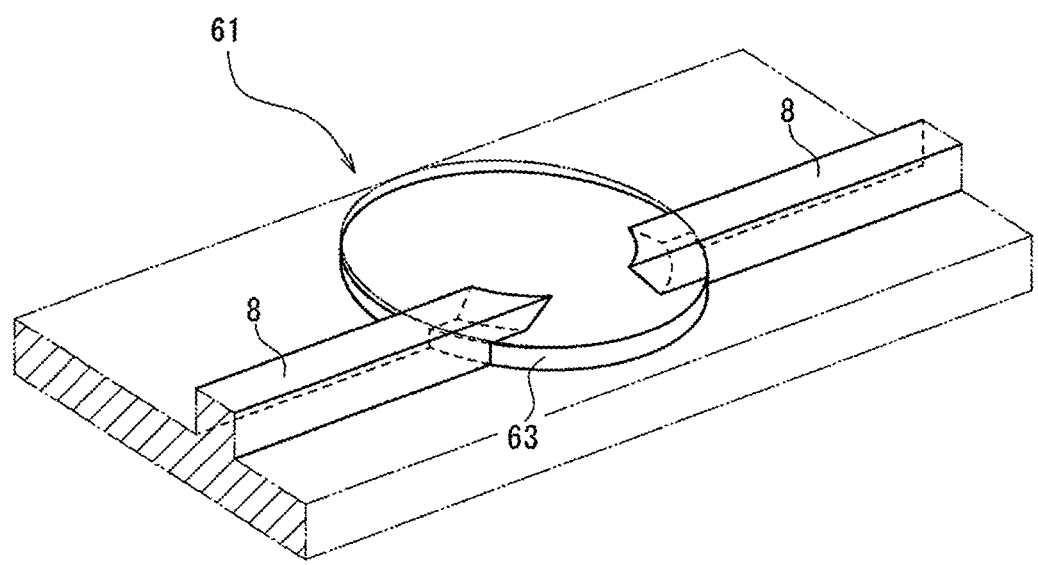
FIG. 10 is a partially-enlarged perspective view of a pneumatic tire, similar to FIG. 4, according to a further modified vulcanizing mold.

By doing this, as illustrated in FIG. 10, a pneumatic tire 61 formed through vulcanization using the tire vulcanizing mold 60 is made to include a spring-vent mark 63 less conspicuous, since the spring-vent mark 63 can be easily formed such that its portion deviated in one side with respect to the saw-cut marks 8 has a smaller height from the tire surface than that of the portion of the spring-vent mark 63 in the other side. Further, since the vent hole 62 is formed so as to be deviated in one side with respect to the groove center of the saw cut 20, it is possible to increase the degree of freedom for the position at which the vent hole 62 is formed.

Figure 8:
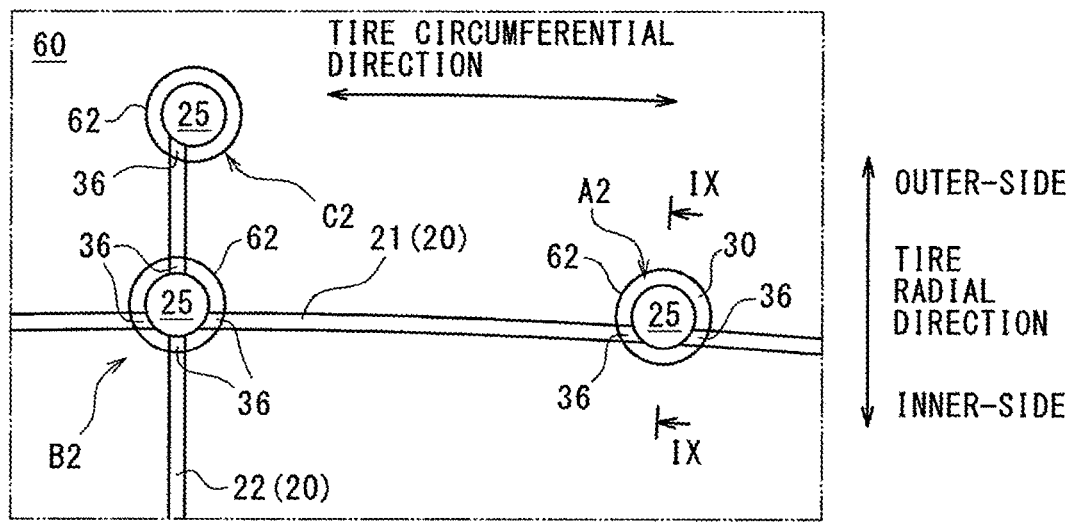
FIG. 8 is a view illustrating a forming surface according to a further modified vulcanizing mold.

Besides, as illustrated by B2 in FIG. 8, a vent hole 62 formed at the portion of the intersection of a circumferential saw cut 21 and a radial saw cut 22 can be deviated in the tire radial direction with respect to the groove center of the circumferential saw cut 21. Further, as illustrated by C2 in FIG. 8, a vent hole 62 formed at an end portion of the radial saw cut 22 can be deviated in the tire circumferential direction with respect to the groove center of the radial saw cut 22.

While the aforementioned embodiment has been described by exemplifying a segmented mold, the present invention can be also applied to a two-piece mold constituted by upper and lower half-split pieces.

Further, the present invention is not limited to the structure described in the aforementioned embodiment, and various changes can be made thereto.

What is claimed is:

1. A tire vulcanizing mold comprising:
   a groove-shaped saw cut and a vent hole which are formed in a forming surface for forming a tire surface, the vent hole being opened in the forming surface so as to communicate with the saw cut; and
   a vent plug being fitted in the vent hole;
   wherein the vent plug includes
   a circular-cylindrical housing interiorly including an air discharging path, and
   a stem being inserted in the housing and including a valve body for opening and closing the air discharging path in an end portion adjacent to the forming surface, and
   wherein the housing has a top surface positioned closer to the forming surface than a groove bottom of the saw cut, and the top surface is provided with a cutout by which the air discharging path and the saw cut are communicated with each other.

2. The tire vulcanizing mold according to claim 1, wherein the cutout is formed within a depth range of the saw cut in a depth direction.

3. The tire vulcanizing mold according to claim 1, wherein
   the cutout is formed so as to be continuous with a groove bottom surface and a groove wall surface of the saw cut.

4. The tire vulcanizing mold according to claim 1, wherein
   the housing is provided with a tapered surface having a diameter increased toward the forming surface in an opening portion at which the air discharging path is opened to the forming surface,
   the valve body is formed to have a truncated conical shape widened toward the forming surface,
   the valve body has a side surface portion having a portion which comes in contact with the tapered surface of the housing to form a sealing portion for closing the air discharging path, and
   the cutout is positioned closer to the forming surface than an end portion of the sealing portion which is farther from the forming surface.

5. The tire vulcanizing mold according to claim 1, wherein the vent hole is formed such that an axis center of the vent hole is deviated in one side with respect to a groove center of the saw cut.

6. The tire vulcanizing mold according to claim 5, wherein
   the vent hole is formed so as to be inclined in the one side in which the vent hole is deviated, from the forming surface toward an opposite side thereof.

7. A method for manufacturing a pneumatic tire by performing vulcanization forming on a green tire, using the tire vulcanizing mold according to claim 1.

* * * * *